US008861195B2

(12) United States Patent
Fu

(10) Patent No.: US 8,861,195 B2
(45) Date of Patent: Oct. 14, 2014

(54) COMPUTER WITH HEAT DISSIPATION SYSTEM

(75) Inventor: Shuang Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 115 days.

(21) Appl. No.: 13/476,131

(22) Filed: May 21, 2012

(65) Prior Publication Data

US 2013/0033816 A1    Feb. 7, 2013

(30) Foreign Application Priority Data

Aug. 2, 2011   (CN) .......................... 2011 1 0219465

(51) Int. Cl.
*H05K 5/00* (2006.01)
*G06F 1/20* (2006.01)
*H05K 7/16* (2006.01)

(52) U.S. Cl.
CPC ........................................ *G06F 1/20* (2013.01)
USPC ................. 361/679.47; 361/679.49; 361/695; 454/184

(58) Field of Classification Search
CPC ................ G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202; G06F 2200/203; H05K 5/0026–5/0082; H05K 7/005–7/08; H05K 7/1422–7/1437; H05K 7/00; H05K 7/20; H05K 9/00; H05K 1/0218–1/0219; H05K 1/00; H05K 3/00; H05K 5/00–5/0021; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H02B 1/00; H01R 4/00; H01R 9/00; H01R 13/00; H01K 1/00–3/00
USPC ............ 361/679.49–679.55, 679.46–679.47, 361/688–723, 679.47–679.52, 361/679.33–679.39; 312/236; 257/721–722; 174/15.1, 16.1, 16.3; 165/185, 80.1–80.3; 454/184
See application file for complete search history.

(56) References Cited

U.S. PATENT DOCUMENTS 6,628,518 B2 * 9/2003 Behl et al. ................. 361/679.47
6,963,489 B2 * 11/2005 Askeland et al. ........ 361/679.51
7,394,653 B2 * 7/2008 Cheng et al. ............. 361/679.48
(Continued)

*Primary Examiner* — Zachary M Pape
*Assistant Examiner* — Razmeen Gafur
(74) *Attorney, Agent, or Firm* — Novak Druce Connolly Bove + Quigg LLP

(57) ABSTRACT

A computer includes a backplane, an enclosure, a motherboard, a shielding cover, a guiding plate, and a fan. The enclosure covers on the backplane. The motherboard is located on the backplane. The motherboard includes a plurality of heat generating elements. A shielding cover covers the motherboard and located in the enclosure. The shielding space is defined in the shielding cover. The guiding plate is located on the backplane adjacent to the shielding cover. A heat dissipating space is defined between the shielding cover and the guiding plate. The heat dissipating space communicates with the shielding space. The fan is located in the heat dissipating space. The fan is adapted to generate airflow from the shielding space and is adapted to dissipate the airflow through the heat dissipating space.

13 Claims, 5 Drawing Sheets

(56) References Cited

U.S. PATENT DOCUMENTS

| | | | | |
|---|---|---|---|---|
| 7,817,424 | B2 * | 10/2010 | Jiang et al. | 361/700 |
| 8,045,327 | B2 * | 10/2011 | Tomioka et al. | 361/679.47 |
| 8,325,484 | B2 * | 12/2012 | Lo | 361/704 |
| 8,456,829 | B2 * | 6/2013 | Chen et al. | 361/679.33 |
| 2012/0002365 | A1 * | 1/2012 | Chen et al. | 361/679.33 |
| 2012/0057290 | A1 * | 3/2012 | Shen et al. | 361/679.22 |
| 2012/0140405 | A1 * | 6/2012 | Huang et al. | 361/679.47 |
| 2012/0281349 | A1 * | 11/2012 | Lai | 361/679.33 |

* cited by examiner

COMPUTER WITH HEAT DISSIPATION SYSTEM

BACKGROUND

1, Technical Field

The present disclosure relates to computers having a heat dissipation system.

2, Description of Related Art

Computers, such as a server, an all-in-one computer, may include a plurality of heat generation elements, such as central processing units (CPU), memories, north and south bridge chips, and metal oxide semiconductor field effect transistors (MOSFET) for assisting the CPUs and the memories, etc. Many MOSFETS are employed in the motherboard and heat generated by the MOSFETS is directly dissipated by the system fans of the computer. However, the heat dissipation of the MOSFETS may be affected by other heat generation elements and becomes ineffective. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
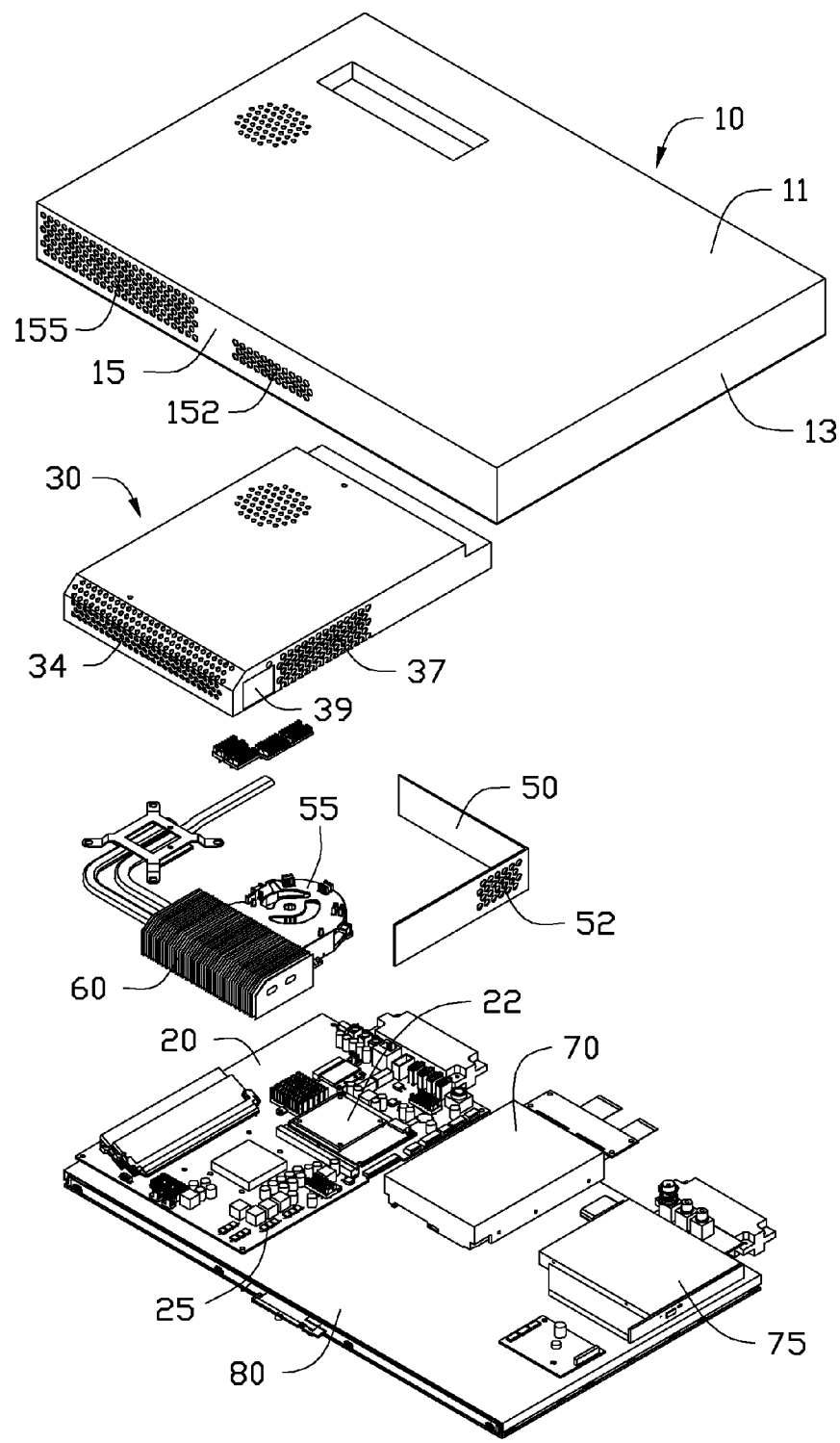
FIG. 1 is an exploded, isometric view of an embodiment of a computer.
Figure 2:
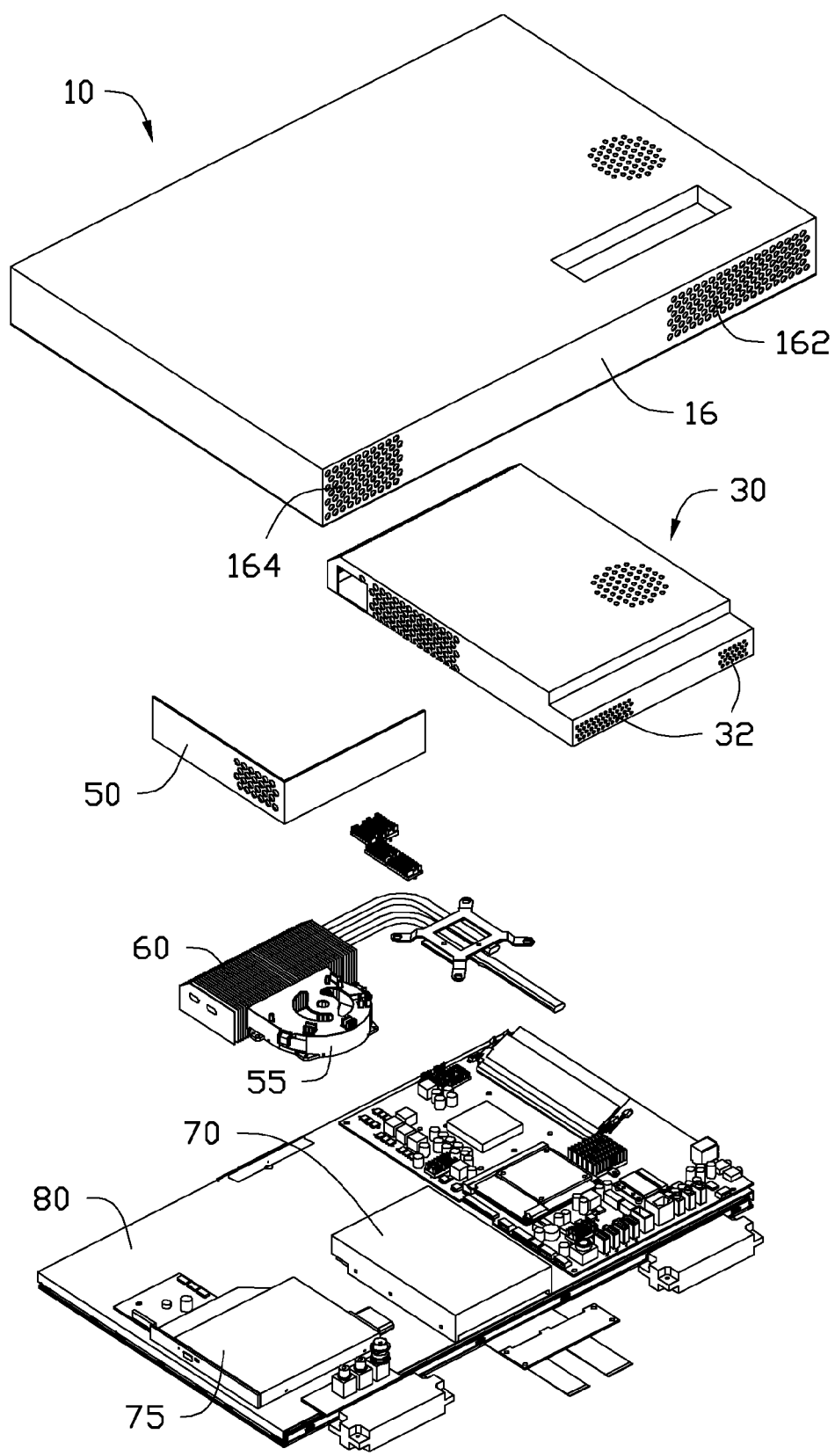
FIG. 2 is similar to FIG. 1, but shown in another aspect.

Referring to FIG. 1 and FIG. 2, one embodiment of computer may be a server or an all-in-one computer. The computer includes an enclosure 10, backplane 80, a motherboard 20, a shielding cover 30, a guiding plate 50, a fan 55, a heat sink 60, a data storage device 70, and a plurality of affiliated elements 75.

The enclosure 10 includes a rear wall 11, two sidewalls 13, a top wall 15, and a bottom wall 16. The two sidewalls 13, the top wall 15 and the bottom wall 16 are perpendicular to the rear wall 11. The two sidewalls 13 are parallel. The top wall 15 and the bottom wall 16 are parallel. A first outlet 152 and an accommodating vent 155 are defined in the top wall 15. A first inlet 162 and a second inlet 164 are defined in the bottom wall 16. Each inlet, outlet, and vent may include a plurality of holes.

The motherboard 20 includes a plurality of heat generating elements, such as CPU 22 and MOSFETS 25. The CPU 22 and the MOSFET 25 thermally contact the heat sink 60 through at least one heat pipe. The heat sink 60 includes a plurality of dissipating fins.

The shielding cover 30 may couple with the motherboard 20. In one embodiment, the shielding cover 30 is rectangular. A cover inlet 32 is defined in the shielding cover 30 corresponding to the first inlet 162. A conditioning vent 34 is defined corresponding to the accommodating vent 155. A cover vent 37 and a communicating hole 39 are defined in one side of the shielding cover 30.

In one embodiment, the guiding plate 50 may be L-shaped or U-shaped, and a plate vent 52 is defined in the guiding plate 50.

Figure 3:
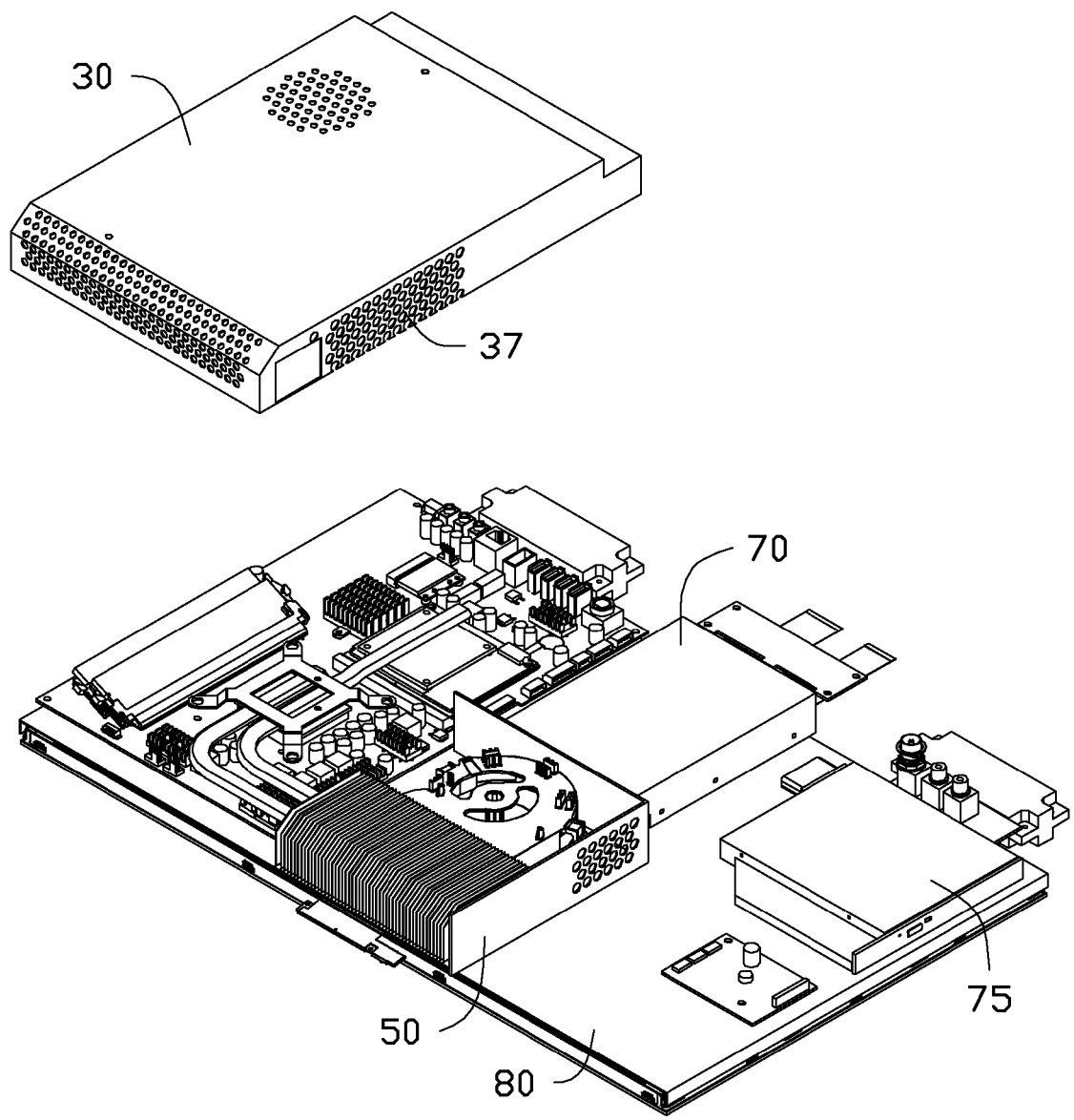
FIG. 3 is a partial assembled view of the computer of FIG. 1.
Figure 4:
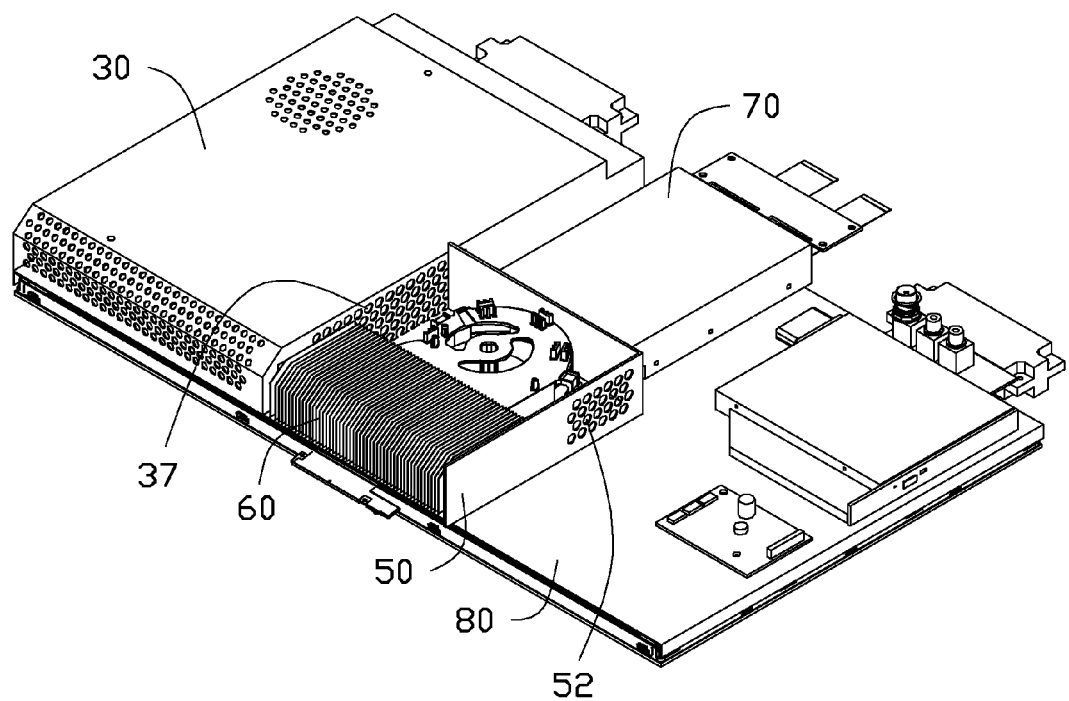
FIG. 4 is an assembled view of the computer of FIG. 3.
Figure 5:
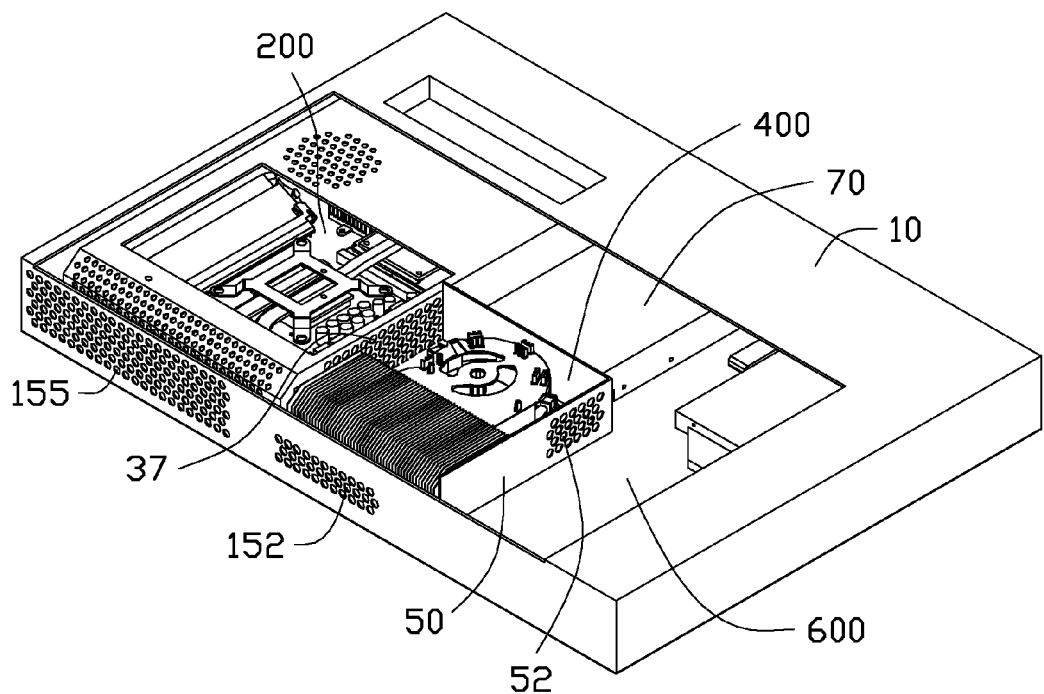
FIG. 5 is an assembled view of the computer of FIG. 1, but partial enclosure is cutout.

Referring through FIG. 3 to FIG. 5, in assembly, the motherboard 20, the heat sink 60, the fan 55, the data storage device 70, and the plurality of affiliated elements 75 are positioned on the backplane 80. The heat sink 60 contacts the CPU 22 and the MOSFET 25 through the heat pipe. The shielding cover 30 covers on the motherboard 20 to form a shielding space 200 therebetween. The guiding plate 50 is located on a side of the shielding cover 30. A heat dissipating space 400 is defined by the guiding plate 50 and the shielding cover 30. The fan 55 and the heat sink 60 are located in the dissipating space 400. The enclosure 10 is covered on the backplane 80. An outer space 600 is defined in the enclosure 10 outside of the shielding cover 30 and the guiding plate 50. The data storage device 70 and the plurality of affiliated elements 75 are located in the outer space 600.

The shielding space 200 communicates the first inlet 162. The heat dissipating space 400 communicates with the shielding space 200 through the cover vent 37. The heat dissipating space 400 communicates with the first outlet 152. The shielding space 200 communicates with the accommodating vent 155. The outer space 600 communicates with the second inlet 164. The plate vent 52 communicates with the outer space 600. The cover vent 37 and the plate vent 52 are located at opposite sides of the heat dissipating space 400.

In use, the fan 55 can generate a first airflow through the shielding space 200 and the heat dissipating space 400, and dissipates the first airflow out of the enclosure 10 through the first outlet 152. A second airflow can also be generated through the outer space 600, and the heat dissipating space 400.

It is also understood, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer comprising:
a backplane;
an enclosure covering on the backplane, the enclosure defining a first inlet and a first outlet;
a motherboard located on the backplane, and the motherboard comprising a plurality of heat generating elements;
a shielding cover covering the motherboard and located in the enclosure, a shielding space being defined in the shielding cover;
a guiding plate located on the backplane adjacent to the shielding cover, a heat dissipating space being defined between the shielding cover and the guiding plate, and the heat dissipating space communicating with the shielding space and the first outlet; and
a fan located in the heat dissipating space;

wherein the fan is adapted to generate airflow from the first inlet and dissipate the airflow through the first outlet via the shielding space and the heat dissipating space;

wherein an outer space is defined in the enclosure, the outer space communicates with the heat dissipating space, and the enclosure defines a second inlet communicating with the outer space;

wherein the shielding cover defines a cover vent communicating with the heat dissipating space, the guiding plate defines a plate vent communicating with the outer space, and the cover vent and the plate vent are located on opposite sides of the heat dissipating space.

2. The computer of claim 1, wherein the enclosure comprises a top wall and a bottom wall opposite to the top wall, the first inlet is defined in the bottom wall, and the first outlet is defined in the top wall.

3. The computer of claim 2, wherein the top wall defines an accommodating vent communicating with the shielding space.

4. The computer of claim 1, further comprising a plurality of data storage devices located in the outer space.

5. The computer of claim 1, wherein the shielding space is substantially cuboid shaped.

6. The computer of claim 1, further comprising a heat sink located in the heat dissipating space, and the heat sink thermally contacting the plurality of heat generating elements.

7. The computer of claim 1, wherein the guiding plate is L-shaped.

8. A computer comprising: a backplane; an enclosure covering on the backplane; a motherboard located on the backplane, and the motherboard comprising a plurality of heat generating elements; a shielding cover covering the motherboard and located in the enclosure, a shielding space being defined in the shielding cover; a guiding plate located on the backplane adjacent to the shielding cover, a heat dissipating space being defined between the shielding cover and the guiding plate, and the heat dissipating space communicating with the shielding space; and a fan, located in the heat dissipating space, and spaced from the shielding space; wherein the fan is adapted to generate airflow from the shielding space and to dissipate the airflow through the heat dissipating space;

wherein the enclosure defines a first inlet and a first outlet, the airflow flows in through the first inlet and flows out through the first outlet;

wherein the enclosure comprises a top wall and a bottom wall opposite to the top wall, the first inlet is defined in the bottom wall, and the first outlet is defined in the top wall;

wherein an outer space is defined in the enclosure, the outer space communicates with the heat dissipating space, and the enclosure defines a second inlet communicating with the outer space;

wherein the shielding cover defines a cover vent communicating with the heat dissipating space, the guiding plate defines a plate vent communicating with the outer space, and the cover vent and the plate vent are located on opposite sides of the heat dissipating space.

9. The computer of claim 8, wherein the top wall defines an accommodating vent communicating with the shielding space.

10. The computer of claim 8, further comprising a plurality of data storage devices located in the outer space.

11. The computer of claim 8, wherein the shielding space is substantially cuboid shaped.

12. The computer of claim 8, further comprising a heat sink located in the heat dissipating space, and the heat sink thermally contacting the plurality of heat generating elements.

13. The computer of claim 8, wherein the guiding plate is L-shaped or U-shaped.

* * * * *